United States Patent
Pan et al.

(10) Patent No.: US 12,493,070 B2
(45) Date of Patent: Dec. 9, 2025

(54) PARALLEL ACCELERATED TEST METHOD AND APPARATUS THAT SEPARATELY APPLIES MULTIPLE SENSITIVE STRESSES TO MULTIPLE COMPONENTS

(71) Applicant: CHINA ELECTRONIC PRODUCT RELIABILITY AND ENVIRONMENTAL TESTING RESEARCH INSTITUTE ( (THE FIFTH ELECTRONIC RESEARCH INSTITUTE OF MINISTRY OF INDUSTRY AND INFORMATION TECHNOLOGY) (CEPREI) ), Guangzhou (CN)

(72) Inventors: Guangze Pan, Guangzhou (CN); Qian Li, Guangzhou (CN); Xiaobing Li, Guangzhou (CN); Baimao Lei, Guangzhou (CN); Xianghong Hu, Guangzhou (CN); Debin Cheng, Guangzhou (CN); Qin Luo, Guangzhou (CN); Zigang Cai, Guangzhou (CN); Dan Li, Guangzhou (CN); Fangfei Liu, Guangzhou (CN); Guoqing Wang, Guangzhou (CN)

(73) Assignee: China Electronic Product Reliability and Environmental Testing Research Institute ((The Fifth Electronic Research Institute of Ministry of Industry and Information Technology) (CEPREI)), Guangdong (CN)

( * ) Notice: Subject to any disclaimer, the term of this patent is extended or adjusted under 35 U.S.C. 154(b) by 0 days.

(21) Appl. No.: 19/082,586

(22) Filed: Mar. 18, 2025

(65) Prior Publication Data
US 2025/0290971 A1 Sep. 18, 2025

(30) Foreign Application Priority Data
Mar. 18, 2024 (CN) .......................... 202410305883.0

(51) Int. Cl.
*G01R 31/26* (2020.01)
(52) U.S. Cl.
CPC .............................. *G01R 31/2642* (2013.01)
(58) Field of Classification Search
CPC .................................................. G01R 31/2642
See application file for complete search history.

(56) References Cited

U.S. PATENT DOCUMENTS

| | | | |
|---|---|---|---|
| 2004/0117501 A1 | 6/2004 | Day et al. | |
| 2019/0354077 A1* | 11/2019 | Chang | G05B 19/315 |
| 2022/0187362 A1* | 6/2022 | Ascazubi | G01R 31/2875 |

FOREIGN PATENT DOCUMENTS

| | | | | |
|---|---|---|---|---|
| CN | 102508484 A | * | 6/2012 | |
| CN | 108106873 A | * | 6/2018 | G01M 99/00 |

(Continued)

OTHER PUBLICATIONS

CN102508484A English Translation (Year: 2012).*
(Continued)

*Primary Examiner* — Kyle R Quigley
(74) *Attorney, Agent, or Firm* — Quarles & Brady LLP

(57) ABSTRACT

Disclosed are a parallel accelerated test method and apparatus that separately applies multiple sensitive stresses to multiple components. Sensitive stress types of different product components are determined respectively, and accelerated test stress values of the different product components are determined respectively based on the sensitive stress types. The overall product acceleration coefficient is determined, the accelerated test stress values of different product components are corrected based on the overall product acceleration coefficient, and the multi-box coordinated (Continued)

deployment scheme is determined based on the sensitive stress types of different product components and the corrected stress values in accelerated test. Based on an accelerated test confidence level and product failure count threshold, a target accelerated test scheme is determined from candidate accelerated test schemes. Under the multi-box coordinated deployment scheme, the target accelerated test scheme is executed in parallel on different product components to obtain a product life evaluation result.

10 Claims, 5 Drawing Sheets

(56) References Cited

FOREIGN PATENT DOCUMENTS

| CN | 113297736 A | 8/2021 |
|----|-------------|--------|
| CN | 114035042 A | 2/2022 |
| CN | 114357812 A | 4/2022 |
| CN | 114384365 A | 4/2022 |
| CN | 116227240 A | 6/2023 |
| CN | 117892564 B | 6/2024 |

OTHER PUBLICATIONS

CN108106873A English Translation (Year: 2018).*
Wang et al., Reliability Evaluation Method for Robot Servo System Based on Accelerated Degradation Test, ICEMS, 2019 (Year: 2019).*
Zhang et al., Fault Diagnostic Opportunities for Robot Servo Motors Using the Physics of Failure Analysis, ICRMS, 2023 (Year: 2023).*
Li Chen-yang; "Research of Accelerated Life Testing Method of Fuze System Electronic Products" w/Eng translation; Missiles and Space Vehicles; No. 1 2017 Sum No. 351; Jan. 2017; 4 pages.
Li Dan, et al. "Reliability Test and Evaluation Study on MMC Secondary Board Cards in Flexible DC Transmission System" w/Eng translation; Journal of Ordnance Equipment Engineering; Sep. 2023; 10 pages.
Notice of Decision to Grant dated May 16, 2024, with respect to CN Application No. 202410305883.0, w/Eng translation, 7 pages.
Office Action mailed Apr. 22, 2024, with respect to CN Application No. 202410305883.0 w/Eng translation, 18 pages.
Zhang, et al., "Multi-Stress Accelerated Life Evaluation Method Considering Generalized Coupling" w/Eng translation; Systems Engineering and Electronics; vol. 45 No. 10; Oct. 2023; 12 pages.

* cited by examiner

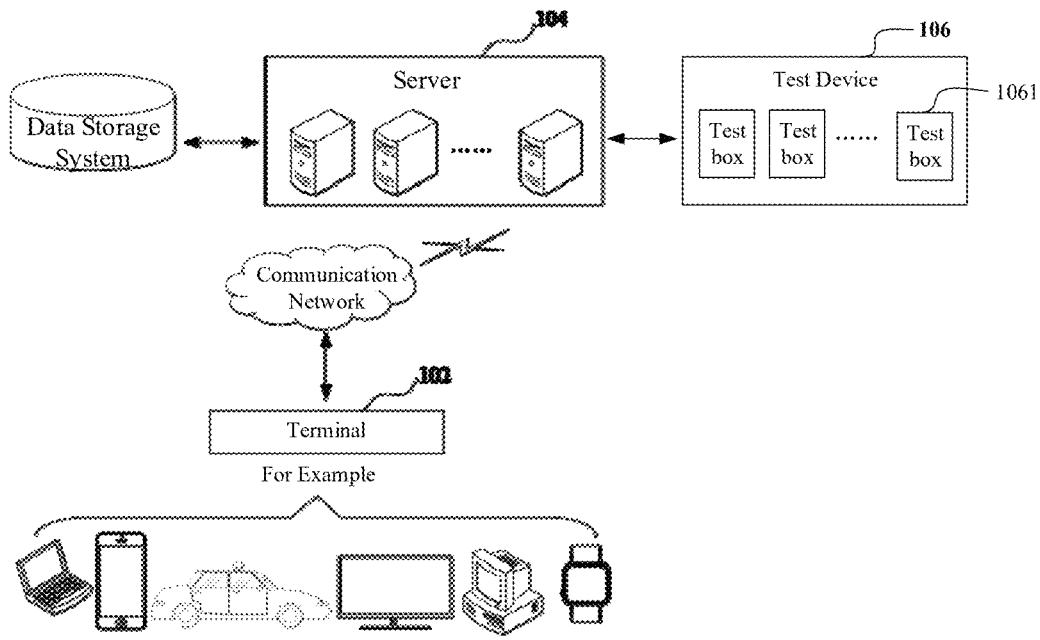

FIG. 1

| | |
|---|---|
| Determine sensitive stress types of different types of product components in a multi-component product respectively, and determine accelerated test stress values of different types of product components respectively based on the sensitive stress types of different types of product components | S202 |
| Determine an overall product acceleration coefficient corresponding to the multi-component product, and correct the accelerated test stress values corresponding to different types of product components respectively based on the overall product acceleration coefficient to obtain the corrected accelerated test stress values corresponding to different types of product components | S204 |
| Based on the sensitive stress types and the corrected accelerated test stress values of the different types of product components, determine a multi-box coordinated deployment scheme corresponding to the multi-component product | S206 |
| Determine a target accelerated test scheme from candidate accelerated test schemes based on an accelerated test confidence level and a product failure count threshold corresponding to the multi-component product | S208 |
| Based on the multi-box coordinated deployment scheme, perform the target accelerated test scheme on the multi-component product to obtain a product life evaluation result corresponding to the multi-component product | S210 |

FIG. 2

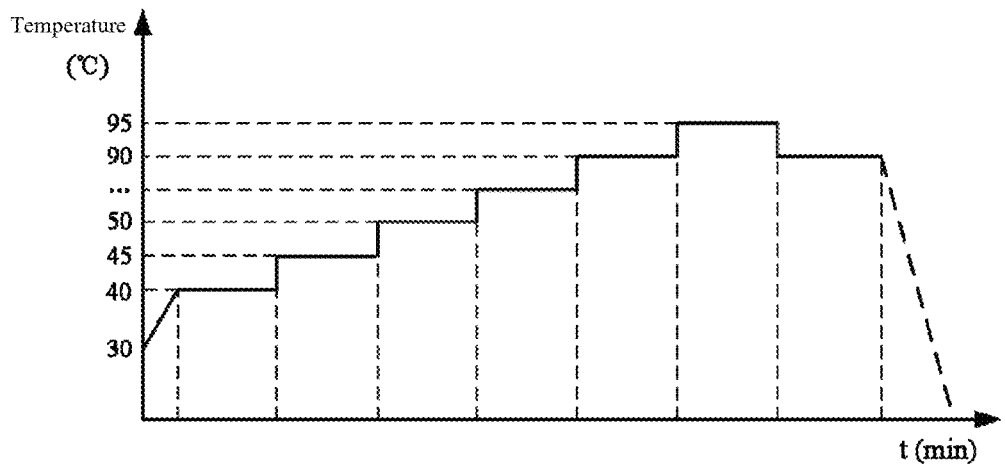

FIG. 3

| | |
|---|---|
| Obtain normal failure rate under normal operating stress and accelerated failure rate under accelerated stress of each of the different types of product components respectively | S402 |
| For the different types of product components, determine the component acceleration coefficients corresponding to the different types of product components based on normal failure rate under normal operating stress and accelerated failure rate under accelerated stress of each of the different types of product components respectively | S404 |
| Determine the overall product acceleration coefficient based on the component acceleration coefficients corresponding to the different types of product components | S406 |

FIG. 4

PARALLEL ACCELERATED TEST METHOD AND APPARATUS THAT SEPARATELY APPLIES MULTIPLE SENSITIVE STRESSES TO MULTIPLE COMPONENTS

CROSS-REFERENCE TO RELATED APPLICATIONS

The present application claims priority to Chinese patent application No. 2024103058830, filed on Mar. 18, 2024, the entire content of which is incorporated herein by reference.

TECHNICAL FIELD

The present disclosure relates to the field of product testing technologies, and in particular, to a parallel accelerated test method and apparatus that separately applies multiple sensitive stresses to multiple components, computer device, storage medium and computer program product.

BACKGROUND

With the development of product testing technology and the widespread application of various products in production and life, in order to ensure the safe and reliable use of products, accelerated tests for products have emerged to evaluate product life index in a shorter time. The accelerated tests are to accelerate the failure or degradation process of the product by applying stress values that are more severe than those in normal operating of the product without changing the failure mode and failure mechanism of the product, and obtain the failure data or degradation data of the product in a short time to evaluate the life index of the product under normal operating stress, i.e., the accelerated tests can evaluate the life index of the product in a shorter time.

SUMMARY

In a first aspect, a parallel accelerated test method that separately applies multiple sensitive stresses to multiple components is provided in the present disclosure. The method is applied to a testing system. The testing system includes a server and a test device, and the test device includes multiple test boxes. Each of the test boxes is configured to perform an accelerated test on product components placed therein. The method includes:
  determining sensitive stress types of different types of product components in a multi-component product respectively, and determining accelerated test stress values of the different types of product components respectively based on the sensitive stress types of the different types of product components, the sensitive stress type of the product component being the stress type that affects more product failure modes of the product component;
  determining component acceleration coefficients corresponding to the different types of product components, determining a minimum component acceleration coefficient based on the component acceleration coefficients, using the minimum component acceleration coefficient as an overall product acceleration coefficient corresponding to the multi-component product, and correcting the accelerated test stress values corresponding to the different types of product components respectively based on the overall product acceleration coefficient to obtain corrected accelerated test stress values corresponding to the different types of product components, the component acceleration coefficients corresponding to different product components being determined based on a ratio of a normal failure rate under normal operating stress to an accelerated failure rate under accelerated stress of each of the different product components;
  placing different types of product components of the multi-component product into different test boxes respectively, applying different sensitive stress types and different corrected accelerated test stress values to different test boxes respectively, and connecting the different types of product components in each of the test boxes to obtain a multi-box coordinated deployment scheme corresponding to the multi-component product;
  determining a target accelerated test scheme from candidate accelerated test schemes based on an accelerated test confidence level and a product failure count threshold corresponding to the multi-component product; and
  under the multi-box coordinated deployment scheme, executing the target accelerated test scheme in parallel for the different types of multi-component product connected in the test boxes, monitoring product functions and performances of the multi-component product in real time, counting a number of failed products corresponding to parallel accelerated test, and obtaining a product life evaluation result corresponding to the multi-component product based on the number of failed products and the preset product failure count threshold;
  where correcting the accelerated test stress values corresponding to the different types of product components respectively based on the overall product acceleration coefficient to obtain corrected accelerated test stress values corresponding to the different types of product components includes: based on the overall product acceleration coefficient, correcting the component acceleration coefficients corresponding to the different types of product components respectively to obtain corrected component acceleration coefficients corresponding to the different types of product components; based on the corrected component acceleration coefficients corresponding to the different types of product components, deducing corrected values for the accelerated test stress values of the different types of product components reversely; based on the corrected values for the accelerated test stress values of the different types of product components, correcting the accelerated test stress values corresponding to the different types of product components respectively to obtain the corrected accelerated test stress values corresponding to the different types of product components.

In a second aspect, a parallel accelerated test apparatus that separately applies multiple sensitive stresses to multiple components is provided in the present disclosure. The apparatus includes:
  a sensitive stress type determination module configured to determine sensitive stress types of different types of product components in a multi-component product respectively, and determine accelerated test stress values of the different types of product components respectively based on the sensitive stress types of the different types of product components, the sensitive stress type of the product component being the stress type that affects more product failure modes of the product component;

an accelerated test stress value correction module configured to determine component acceleration coefficients corresponding to the different types of product components, determine a minimum component acceleration coefficient based on the component acceleration coefficients, use the minimum component acceleration coefficient as an overall product acceleration coefficient corresponding to the multi-component product, and correcting the accelerated test stress values corresponding to the different types of product components respectively based on the overall product acceleration coefficient to obtain corrected accelerated test stress values corresponding to the different types of product components, the component acceleration coefficients corresponding to different product components being determined based on a ratio of a normal failure rate under normal operating stress to an accelerated failure rate under accelerated stress of each of the different product components;

a multi-box coordinated deployment scheme determination module configured to place different types of product components of the multi-component product into different test boxes respectively, apply different sensitive stress types and different corrected accelerated test stress values to different test boxes respectively, and connect the different types of product components in each of the test boxes to obtain a multi-box coordinated deployment scheme corresponding to the multi-component product;

a target accelerated test scheme determination module configured to determine a target accelerated test scheme from candidate accelerated test schemes based on an accelerated test confidence level and a product failure count threshold corresponding to the multi-component product; and a product life evaluation result obtaining module configured to execute the target accelerated test scheme in parallel for the different types of multi-component products connected in the test boxes under the multi-box coordinated deployment scheme, monitor product functions and performances of the multi-component product in real time, count a number of failed products corresponding to the parallel accelerated test, and obtain a product life evaluation result corresponding to the multi-component product based on the number of failed products and the product failure count threshold;

where the accelerated test stress value correction module is configured to correct the component acceleration coefficients corresponding to the different types of product components respectively based on the overall product acceleration coefficient, to obtain corrected component acceleration coefficients corresponding to the different types of product components; based on the corrected component acceleration coefficients corresponding to the different types of product components, deduce corrected values for the accelerated test stress values of the different types of product components reversely; based on the corrected values for the accelerated test stress values of the different types of product components, correct the accelerated test stress values corresponding to the different types of product components respectively to obtain the corrected accelerated test stress values corresponding to the different types of product components.

In a third aspect, a computer device is further provided in the present disclosure. The computer device includes a memory and a processor. The memory stores a computer program. The processor, when executing the computer program, implements the method in the above-mentioned first aspect or its various implementations.

In a fourth aspect, a computer-readable storage medium is further provided in the present disclosure. The computer-readable storage medium has a computer program stored thereon. A processor, when executing the computer program, implements the method in the above-mentioned first aspect or its various implementations.

In a fifth aspect, a computer program product is further provided in the present disclosure. The computer program product includes a computer program. A processor, when executing the computer program, implements the method in the above-mentioned first aspect or its various implementations.

BRIEF DESCRIPTION OF THE DRAWINGS

In order to describe the technical solutions in the embodiments of the present application or the conventional technology more clearly, the following will briefly introduce the accompanying drawings required for describing the embodiments or the conventional technology. Apparently, the accompanying drawings in the following description are merely embodiments of the present disclosure, and for a person of ordinary skill in the art, other drawings can be obtained based on the disclosed drawings without creative efforts.

FIG. 1 is an application environment diagram of a parallel accelerated test method that separately applies multiple sensitive stresses to multiple components in an embodiment.

FIG. 2 is a schematic flow chart of a parallel accelerated test method that separately applies multiple sensitive stresses to multiple components in an embodiment.

FIG. 3 is a schematic diagram of a process for determining stress limits of electronic components in a multi-component product in an embodiment.

FIG. 4 is a schematic diagram of a process for determining an overall product acceleration coefficient corresponding to a multi-component product in an embodiment.

DETAILED DESCRIPTION OF THE EMBODIMENTS

Figure 5:
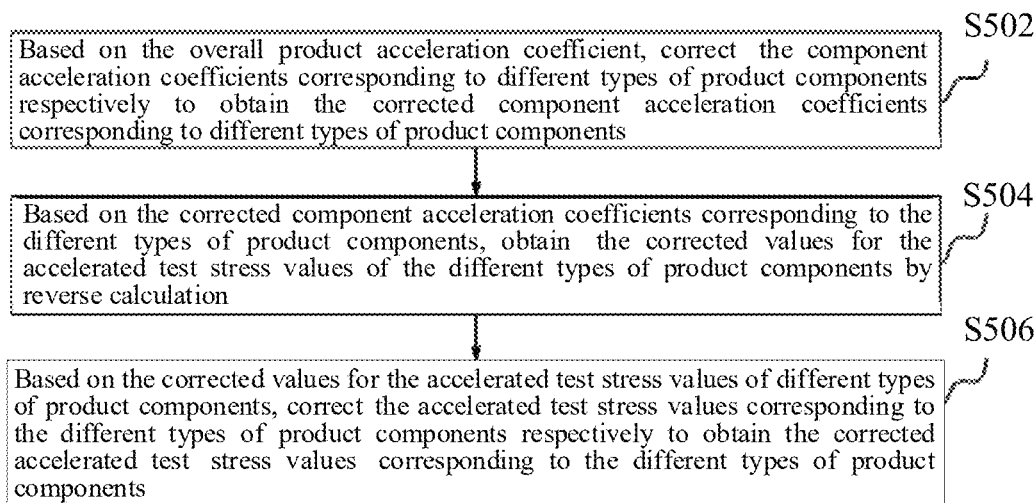
FIG. 5 is a schematic diagram of a process for obtaining corrected accelerated test stress values corresponding to different types of product components in an embodiment.

To make the purposes, features, and advantages of the present disclosure more clearly understood, detailed explanations of specific embodiments of the present disclosure are provided below in conjunction with the accompanying drawings. It should be understood that the specific embodiments described herein are only used to explain the present disclosure and are not used to limit the present disclosure.

It should be noted that when an element is referred to as being "connected" to another element, it can be directly connected to the other element or connected to the other element through intervening elements. In addition, the "connection" in the following embodiments should be "electrical connection", "communication connection" and the like if there is transmission of electrical signals or data between the objects to be connected.

As used herein, the singular forms "a" "an" and "this/the" may also include plural forms, unless otherwise clearly indicated. It should also be understood that the terms "includes/contains" or "have" etc. indicate the existence of the stated features, wholes, steps, operations, components, parts or combinations thereof. However, these terms do not exclude the possibility of the existence of one or more other features, wholes, steps, operations, components, parts or combinations thereof.

In conventional technology, when performing accelerated tests on products, a single stress is typically applied to multiple components for accelerated testing. In other words, by analyzing the sensitive stress types of the product, one or more stresses are selected and applied to the entire product for accelerated testing.

However, products consist of a variety of components, and different components have different sensitive stress types and stress limits. Conventional accelerated test methods do not take into account the diversity of component sensitive stress types and stress limits. Instead, all components are placed in the same test box and the same stress type and stress value are applied to the entire product. However, since a single test stress cannot cover the sensitive stress types of all components, the test efficiency cannot reach the maximum acceleration efficiency of each component and the entire product. As a result, there is a significant error in the test result, requiring repeated testing, and the problem of low testing efficiency still exists.

In view of this, a parallel accelerated test method that separately applies multiple sensitive stresses to multiple components is provided.

The parallel accelerated test method provided in the embodiments of the present disclosure can be applied in the application environment shown in FIG. 1. The application environment is an accelerated testing system, and the accelerated testing system includes a terminal 102, a server 104, and a test device 106. The terminal 102 communicates with the server 104 via a network. The server 104 is also connected to the test device 106 via wired or wireless methods. The test device 106 includes multiple test boxes 1061. When performing accelerated testing on a product, multiple components of the product are placed separately into the multiple test boxes 1061, each test box 1061 is configured to perform accelerated testing on the component of the product placed therein according to control instructions from the server 104. A data storage system can store data that the server 104 needs to process. The data storage system may be integrated on the server 104 or placed on the cloud or other network servers. When receiving a product life test instruction triggered by the terminal 102, the server 104 determines sensitive stress types of different types of product components in a multi-component product respectively, and determines accelerated test stress values of the different types of product components respectively based on the sensitive stress types of the different types of product components. Then, the server 104 determines an overall product acceleration coefficient corresponding to the multi-component product, and corrects the accelerated test stress values corresponding to different types of product components respectively based on the overall product acceleration coefficient to obtain corrected accelerated test stress values corresponding to different types of product components. In this way, based on the sensitive stress types and the corrected accelerated test stress values of different types of product components, a coordinated testing scheme using multiple test boxes (also known as the multi-box coordinated deployment scheme) to perform accelerated testing on the multi-component product can be determined. Furthermore, the server 104 determines a target accelerated test scheme from candidate accelerated test schemes based on the accelerated test confidence level and product failure count threshold corresponding to the multi-component product, so that under the multi-box coordinated deployment scheme, the server 104 further controls the test boxes 1061 to execute the target accelerated test scheme for the multi-component product to obtain a product life evaluation result of the multi-component product. The server 104 further feeds back the obtained product life evaluation result to the terminal 102. The terminal 102 can be but is not limited to various personal computers, laptops, smart phones, tablets, Internet of Things devices and portable wearable devices. The Internet of Things devices can be smart speakers, smart TVs, smart air conditioners, smart car-mounted devices, etc. Portable wearable devices can be smart watches, smart bracelets, head-mounted devices, etc. The server 104 may be implemented as an independent server or a server cluster consisting of multiple servers.

In other embodiments, the server or the terminal may be omitted in the testing system, and the operations performed by the server and terminal as mentioned above can be performed by a single device (the server or the terminal). That is to say, the testing system includes a server and a testing device. Alternatively, the testing system includes a terminal and a testing device.

In an exemplary embodiment, as shown in FIG. 2, a parallel accelerated test method that separately applies multiple sensitive stresses on multiple components is provided. The method can be executed by a terminal or a server alone, or by a terminal and a server in collaboration. In the embodiment of the present disclosure, the method is applied to the server 104 in FIG. 1 as an example for explanation, including the following steps S202 to S210.

In step S202, sensitive stress types of different types of product components in a multi-component product are respectively determined, and accelerated test stress values of different types of product components are respectively determined based on the sensitive stress types of different types of product components.

In some embodiments, the server determines the product failure modes of each type of the different types of product components in a multi-component product, and determines failure mechanisms based on the product failure modes to obtain stress types associated with the failure mechanisms. The server further screens the stress types to obtain the sensitive stress type of each type of the different types of product components respectively based on sensitive stress type screening criteria. The failure modes, failure mechanism, and screening criteria may be preset in the server.

In some embodiments, multiple identical components in a multi-component product are determined as the same type of product components. For example, assuming that a multi-component product includes multiple electronic switches, multiple resistors, multiple bearings, etc., then the multiple electronic switches are determined as a first type of product component, the multiple resistors are determined as a second type of product component, and the multiple bearings are determined as a third type of product component.

For example, the multi-component product includes an electronic component and a mechanical component. For the electronic component, the server analyzes the product failure modes of the electronic component, determines the failure mechanism of each of the product failure modes, and then determines the stress types that affect the failure mechanism, i.e., obtains the stress types associated with the failure mechanism. Furthermore, based on sensitive stress type screening criteria, the stress type that affects the most failure modes is screened out as the sensitive stress type of the electronic component. Exemplarily, as shown in Table 1 (sensitive stress type analysis table for electronic component X), a sensitive stress type analysis method of an electronic component X is provided.

TABLE 1

Analysis table of sensitive stress types for electronic component X

| Number | Failure Modes | Failure Mechanisms | Stress Types Associated With Failure Mechanisms |
|---|---|---|---|
| 1 | Failure Mode A | Failure Mechanism A | Temperature |
| 2 | Failure Mode B | Failure Mechanism B | Temperature |
| 3 | Failure Mode C | Failure Mechanism C | Temperature |
| 4 | Failure Mode D | Failure Mechanism D | Humidity |
| 5 | Failure Mode E | Failure Mechanism E | Vibration |
| 6 | Failure Mode F | Failure Mechanism F | Impact |

Specifically, referring to Table 1 (sensitive stress type analysis table for electronic component X), it can be seen that the failure modes of the electronic component X include failure mode A, failure mode B, failure mode C, failure mode D, failure mode E, and failure mode F. The failure mechanisms corresponding to the failure modes are failure mechanism A, failure mechanism B, failure mechanism C, failure mechanism D, failure mechanism E, and failure mechanism F, respectively. The stress types associated with the failure mechanism A, failure mechanism B and failure mechanism C are all temperature, the stress type associated with the failure mechanism D is humidity, the stress type associated with the failure mechanism E is vibration, and the stress type associated with the failure mechanism F is impact. Therefore, the stress type that affects the most failure modes is temperature, and temperature is configured as the sensitive stress type of the electronic component X. That is to say, according to the above table 1, the sensitive stress type of X-type electronic components is determined to be temperature.

Similarly, for each mechanical component, the server analyzes the product failure modes of the mechanical component, determines the failure mechanism of each of the product failure modes, and then analyzes the stress types that affects the failure mechanism, i.e., obtains the stress types associated with the failure mechanism. Furthermore, based on sensitive stress type screening criteria, the stress type that affects the most failure modes is screened out as the sensitive stress type of the mechanical component.

Exemplarily, the product failure modes of the mechanical component include failure mode 1, failure mode 2, failure mode 3, failure mode 4, failure mode 5, and failure mode 6, and the failure mechanisms corresponding to the product failure modes are failure mechanism 1, failure mechanism 2, failure mechanism 3, failure mechanism 4, failure mechanism 5, and failure mechanism 6, respectively. The stress types associated with the failure mechanism 1, failure mechanism 4 and failure mechanism 5 are all loads, the stress types associated with failure mechanism 2 and failure mechanism f3 are impacts, and the stress type associated with failure mechanism 6 is humidity. Therefore, the stress type that affects the most failure modes is load, and load is configured as the sensitive stress type of the mechanical component.

By using the same method, the sensitivity stress type of each type of product component in the product to be tested can be determined.

In an exemplary embodiment, after the sensitive stress types of different types of product components are obtained, the server further determines stress limits of the different types of product components based on the sensitive stress types of different types of product components.

Continuing with the foregoing example, for the electronic component, the server generates a stress limit test scheme based on the sensitive stress type of the electronic component, and performs tests step by step by gradually tightening the stress. When the electronic component works normally under a certain stress gradient, and then fails after the stress is gradually increased to the next stress gradient, but resumes normal work when the stress gradient returns to the original stress gradient, the original stress gradient is the stress limit of the electronic component. Similarly, for the mechanical component, the server generates a stress limit test scheme based on the sensitive stress type of the mechanical component, and performs tests step by step by gradually increasing the stress. When the mechanical component works normally under a certain stress gradient, and then fails after the stress is gradually increased to the next stress gradient, but resumes normal work when the stress gradient returns to the original stress gradient, the original stress gradient is the stress limit of the mechanical component.

In an exemplary embodiment, as shown in FIG. 3, a process for determining the stress limit of the electronic component in the multi-component product is provided. Referring to FIG. 3, it can be seen that for the electronic component, when gradually increasing the temperature stress, the electronic component works normally under a stress gradient of 90° C., then fails when the temperature stress is gradually increased to a stress gradient of 95° C., and work normally again when the temperature stress is returned to the original stress gradient of 90° C., so that 90° C. is the stress limit of the electronic component.

Furthermore, after the stress limits of different types of product components are obtained, the server further determines the accelerated test stress values of different types of product components based on the stress limits of different types of product components.

In some embodiments, the accelerated test stress value is determined by subtracting a certain amount from the stress limit. Continuing with the foregoing example, for the electronic component, the server determines the accelerated test stress value based on the stress limit of the electronic component. Exemplarily, for the temperature stress, the stress limit minus 10° C. is adopted as high-temperature accelerated test stress value, and the stress limit plus 10° C. is adopted as low-temperature accelerated test stress value. For humidity stress, the accelerated test stress value of humidity is the stress limit minus 10%. Similarly, for the mechanical component, the server determines the accelerated test stress values based on the stress limits of the mechanical component. In some embodiments, the accelerated test stress value is determined by subtracting a certain amount from the stress limit. Exemplarily, for load stress, if the stress limit of the mechanical component is 5 times the rated load, the accelerated test stress value of load is the stress limit minus 1 times the rated load. For impact stress, if the stress limit of a mechanical component is 100 joules per square meter, the accelerated test stress values of impact is the stress limit minus 10 joules per square meter.

In step S204, an overall product acceleration coefficient corresponding to the multi-component product is determined, and the accelerated test stress values corresponding to the different types of product components are corrected respectively based on the overall product acceleration coefficient to obtain corrected accelerated test stress values corresponding to the different types of product components.

Specifically, the server determines the component acceleration coefficients corresponding to different types of product components, and determines the overall product acceleration coefficient based on the component acceleration coefficients corresponding to the different types of product components. In some embodiments, the minimum component acceleration coefficient is taken as the overall product acceleration coefficient. Continuing with the foregoing example, the component acceleration coefficients of multi-component products include an electronic component acceleration coefficient and a mechanical component acceleration coefficient. Specifically, based on the electronic component acceleration coefficient and the mechanical component acceleration coefficient, a minimum component acceleration coefficient is determined as the overall product acceleration coefficient.

Furthermore, after the overall product acceleration coefficient corresponding to the multi-component product is determined, the server corrects the component acceleration coefficients corresponding to the different types of product components based on the overall product acceleration coefficient to obtain the corrected component acceleration coefficients corresponding to different types of product components, such as the corrected electronic component acceleration coefficients corresponding to the electronic component and the corrected mechanical component acceleration coefficient corresponding to the mechanical component.

The server corrects the accelerated test stress values corresponding to different types of product components based on the corrected component acceleration coefficients corresponding to different types of product components, respectively. Continuing with the foregoing example, the corrected component acceleration coefficients include a corrected electronic component acceleration coefficient corresponding to the electronic component, and a corrected mechanical component acceleration coefficient corresponding to the mechanical component, i.e., the accelerated test stress value of the electronic component is corrected based on the corrected electronic component acceleration coefficient, and the accelerated test stress value of the mechanical component is corrected based on the corrected mechanical component acceleration coefficient, so as to obtain the corrected accelerated test stress values corresponding to the electronic component and the corrected accelerated test stress values corresponding to the mechanical component.

In step S206, based on the sensitive stress types and the corrected accelerated test stress values of the different types of product components, a multi-box coordinated deployment scheme corresponding to the multi-component product is determined. The multi-box coordinated deployment scheme defines which product components are placed in which test box, as well as the type and value of the accelerated stress applied by each test box to the product component placed therein. The product components placed in different test boxes are connected as the same way they are connected in the product under test. In other words, the multi-box coordinated deployment scheme is a coordinated testing method that applies corresponding accelerated stresses to multiple components of a multi-component product simultaneously through multiple test boxes, thereby achieving accelerated testing of the multiple components.

Specifically, after the server obtains the sensitive stress types and corrected accelerated test stress values of different types of product components, different types of components of the multi-component product are placed in different test boxes, respectively, and each test box applies the sensitive stress type and the corrected accelerated test stress value corresponding to the product components placed therein. For example, after the sensitive stress type (such as temperature stress) and corrected accelerated test stress value corresponding to the electronic component, and the sensitive stress type (such as load stress) and corrected s accelerated test tress values corresponding to the mechanical component are obtained, the electronic component is placed in a test box and subjected to the corrected temperature stress value, while the mechanical component is placed in another test box and subjected to the corrected load stress value.

Furthermore, cables are used to connect different types of product components in each test box, so that a multi-box coordinated deployment scheme corresponding to the multi-component product can be obtained based on the connection methods of different product components, applying different sensitive stress types and different corrected accelerated test stress values to different test boxes.

In step S208, a target accelerated test scheme is determined from candidate accelerated test schemes based on an accelerated test confidence level and a product failure count threshold corresponding to the multi-component product.

In some embodiments, the server obtains the accelerated test confidence level and product failure count threshold pre-set for the multi-component product, obtains a plurality of pre-set candidate accelerated test schemes, and determines the target accelerated test scheme from the candidate accelerated test schemes based on the accelerated test confidence level and product failure count threshold corresponding to the multi-component product.

In an exemplary embodiment, after the multi-box coordinated deployment scheme corresponding to the multi-component product is determined, the method further includes: obtaining the preset product life target value corresponding to the multi-component product, and the number of multi-component products to be accelerated tested, and determining the accelerated test time corresponding to the multi-component product based on a time correction factor corresponding to the multi-component product, the preset product life target value, the overall product acceleration coefficient, and the number of multi-component products.

The accelerated test time is configured to determine the accelerated test efficiency of multi-component product, i.e., by determining the accelerated test time corresponding to the multi-component product, and taking the accelerated test time corresponding to the multi-component product as one of the candidate accelerated test schemes, the accelerated test time can be comprehensively considered when screening the target accelerated test scheme, and then the accelerated test efficiency of the multi-component product can be obtained when different test schemes are executed for the multi-component product.

Exemplarily, the following formula (1) is adopted to determine the accelerated test time $D_{test}$ corresponding to the multi-component product, based on the time correction factor $C_{factor}$ corresponding to the multi-component product, the preset product life target value $L_{time}$, the overall product acceleration coefficient A, and the number of multi-component products $B_{sum}$:

$$D_{test} = \frac{C_{factor} \times L_{time}}{A \times B_{sum}} \quad (1)$$

where $C_{factor}$ is the time correction factor corresponding to the multi-component product, $L_{time}$ is the preset product life target value corresponding to the multi-component product, A is the overall product acceleration coefficient corresponding to the multi-component product, and $B_{sum}$ is the total number of multi-component products to be tested.

Furthermore, as shown in Table 2 (table of candidate accelerated test schemes), a plurality of candidate accelerated test schemes pre-set for multi-component product is provided, and each candidate accelerated test scheme specifically involves an accelerated test confidence level, a time correction factor, a product failure count threshold, and an accelerated test time for the multi-component product.

TABLE 2

Candidate accelerated test schemes

| Test Schemes | Accelerated Test Confidence Level | Time Correction Factor | Product Failure Count Threshold | Accelerated Test Time |
|---|---|---|---|---|
| Scheme 1 | 70% | 3.62 | 2 | $D_{test}$ |
| Scheme 2 | 70% | 2.44 | 1 | $D_{test}$ |
| Scheme 3 | 70% | 1.20 | 0 | $D_{test}$ |
| Scheme 4 | 80% | 2.99 | 1 | $D_{test}$ |
| Scheme 5 | 80% | 1.61 | 0 | $D_{test}$ |

Referring to Table 2, the pre-set candidate accelerated test schemes include: 1) Scheme 1: accelerated test confidence level ω is 70%, time correction factor $C_{factor}$ is 3.26, product failure count threshold $E_{accept}$ is 2, and accelerated test time is $D_{test}$. 2) Scheme 2: accelerated test confidence level ω is 70%, time correction factor $C_{factor}$ is 2.44, product failure count threshold $E_{accept}$ is 1, accelerated test time is $D_{test}$. 3) Scheme 3: accelerated test confidence level ω is 70%, time correction factor $C_{factor}$ is 1.20, product failure count threshold $E_{accept}$ is 0, accelerated test time is $D_{test}$. 4) Scheme 4: accelerated test confidence level ω is 80%, time correction factor $C_{factor}$ is 2.99, product failure count threshold $E_{accept}$ is 1, accelerated test time is $D_{test}$. 5) Scheme 5: accelerated test confidence level ω is 80%, time correction factor $C_{factor}$ is 1.61, product failure count threshold $E_{accept}$ is 0, accelerated test time is $D_{test}$.

For example, if the pre-set accelerated test confidence level for a multi-component product is 70% and the product failure count threshold is 0, then based on the five candidate accelerated test schemes provided in Table 2, Scheme 3, i.e., "the accelerated test confidence level ω is 70%, the time correction factor $C_{factor}$ is 1.20, the product failure count threshold $E_{accept}$ is 0, and the accelerated test time is $D_{test}$", can be determined as the target accelerated test scheme. Based on the different accelerated test confidence levels and product failure count thresholds pre-set for multi-component products, a matching target accelerated test scheme can be screened out from candidate accelerated test schemes.

In step S210, based on the multi-box coordinated deployment scheme, the target accelerated test scheme for the multi-component product is executed to obtain a product life evaluation result corresponding to the multi-component product.

In some embodiments, the server generates indication information that indicates the test box corresponding to each type of product component of the multi-component product to be tested. After placing the different types of product components of the multi-component product into different test boxes, the server controls the different test boxes to apply different sensitive stress types and different corrected accelerated test stress values, connects different types of product components in each of the test boxes to obtain a multi-box coordinated deployment scheme corresponding to the multi-component product. After the different types of product components of the multi-component product are deployed based on the multi-box coordinated deployment scheme, and the server executes the determined target accelerated test scheme in parallel for different types of product components in the test boxes to obtain the number of failed products corresponding to the multi-component product.

It should be noted that there may be a plurality of multi-component products under an accelerated test. The number of failed products refers to the number of multi-component products that fail during accelerated test.

Furthermore, the server compares the product failure count threshold with the number of failed products, and obtains a product life evaluation result corresponding to the multi-component product based on the comparison result between the product failure count threshold and the number of failed products. If the server determines that the number of failed products is greater than the product failure count threshold, then it determines that the product life is less than the preset product life target value, and determines the product life evaluation result corresponding to the multi-component product as unqualified. On the contrary, if the server determines that the number of failed products is less than or equal to the product failure count threshold, it determines that the product life is greater than or equal to the preset product life target value, and determines the product life evaluation result corresponding to the multi-component product as qualified.

In the above-mentioned parallel accelerated test method, the sensitive stress types of different types of product components in the multi-component product are respectively determined, and the accelerated test stress values of different types of product components are respectively determined based on the sensitive stress types of the different types of product components. Then, the overall product acceleration coefficient corresponding to the multi-component product is determined, and the accelerated test stress values corresponding to different types of product components are respectively corrected based on the overall product acceleration coefficient to obtain the corrected accelerated test stress values corresponding to different types of product components. Therefore, on the basis of a comprehensive evaluation of the overall product acceleration coefficient, the accelerated test stress values of different types of product components can be reversed, thereby ensuring a maximum acceleration effect of the entire product. Furthermore, based on the sensitive stress types and the corrected accelerated test stress values of different types of product components, the multi-box coordinated deployment scheme corresponding to the multi-component product can be determined. Furthermore, based on the accelerated test confidence level and product failure count threshold corresponding to the multi-component product, the target accelerated test scheme is determined from the candidate accelerated test schemes, so that based on the multi-box coordinated deployment scheme, the target accelerated test scheme is performed on the multi-component product to obtain the product life evaluation result corresponding to the multi-component product. Applying different sensitive stresses to the different types of product components and performing parallel accelerated tests at the same time are realized, which reduces repetitive and tedious test operations and product testing time, while further improving the product testing efficiency based on multi-component products.

In an exemplary embodiment, as shown in FIG. 4, the step of determining the overall product acceleration coefficient corresponding to the multi-component product specifically includes the following steps S402 to S406.

In step S402, normal failure rate under normal operating stress and accelerated failure rate under accelerated stress of each type of the different types of product components are obtained respectively.

In some embodiments, for electronic components of multi-component product, the server uses a failure rate prediction method to obtain the electronic component acceleration coefficients. Based on a preset failure rate prediction standard, the normal failure rate under normal operating stress and the accelerated failure rate under accelerated stress of the electronic components are respectively predicted. Therefore, based on the normal failure rate under normal operating stress and the accelerated failure rate under accelerated stress of the electronic components, the electronic component acceleration coefficients corresponding to the electronic components are obtained.

Similarly, for the mechanical components of multi-component product, the server uses a simulation analysis method to obtain the component acceleration coefficients of the mechanical components. By using a simulation analysis software, the normal failure rate under normal operating stress and the accelerated failure rate under accelerated stress of mechanical components can be simulated respectively, so as to obtain the mechanical component acceleration coefficients corresponding to the mechanical components based on the normal failure rate under normal operating stress and the accelerated failure rate under accelerated stress of the mechanical components.

In step S404, for the different types of product components, the component acceleration coefficients corresponding to the different types of product components are determined based on the normal failure rate under normal operating stress and the accelerated failure rate under accelerated stress of each of the different types of product components respectively.

In some embodiments, the server adopts a failure rate prediction method to respectively predict the normal failure rate under normal operating stress and the accelerated failure rate under accelerated stress of electronic components, so as to obtain the electronic component acceleration coefficients corresponding to the electronic components based on the normal failure rate under normal operating stress and the accelerated failure rate under accelerated stress of the electronic components. Specifically, the ratio between the normal failure rate under normal operating stress and the accelerated failure rate under accelerated stress of the electronic component is calculated to obtain the electronic component acceleration coefficient corresponding to the electronic component.

Exemplarily, the following formula (2) is adopted to calculate the electronic component acceleration coefficient corresponding to the electronic component $A_{electronic\ component}$:

$$A_{electronic\ component} = \frac{\lambda 1_{accelerated\ stress}}{\lambda 1_{normal\ operating\ stress}} \quad (2)$$

where $A_{electronic\ component}$ is the electronic component acceleration coefficient, $\lambda 1_{normal\ operating\ stress}$ is the normal failure rate of electronic components under normal operating stress, and $\lambda 1_{accelerated\ stress}$ is the accelerated failure rate of electronic components under accelerated stress.

Similarly, the server adopts a simulation analysis method to simulate the normal failure rate under normal operating stress and the accelerated failure rate under accelerated stress of mechanical components, so as to obtain the mechanical component acceleration coefficients corresponding to the mechanical components based on the normal failure rate under normal operating stress and the accelerated failure rate under accelerated stress of the mechanical components.

Exemplarily, the following formula (3) is adopted to calculate the mechanical component acceleration coefficient corresponding to the mechanical component $A_{mechanical\ component}$:

$$A_{mechanical\ component} = \frac{\lambda 2_{accelerated\ stress}}{\lambda 2_{normal\ operating\ stress}} \quad (3)$$

where $A_{mechanical\ component}$ is the mechanical component acceleration coefficient corresponding to the mechanical component, $\lambda 2_{normal\ operating\ stress}$ is the normal failure rate of the mechanical component under normal operating stress, and $\lambda 2_{accelerated\ stress}$ is the accelerated failure rate of the mechanical component under accelerated stress.

In step S406, the overall product acceleration coefficient is determined based on the component acceleration coefficients corresponding to the different types of product components.

In some embodiments, the component acceleration coefficients of multi-component products include electronic component acceleration coefficients and mechanical component acceleration coefficients. Based on the electronic component acceleration coefficients and the mechanical component acceleration coefficients, the server determines the minimum component acceleration coefficient as the overall product acceleration coefficient.

Exemplarily, a multi-component product consists of N electronic components and M mechanical components, where N electronic acceleration coefficients of the electronic components are $A_{electronic\ component\ 1}$, $A_{electronic\ component\ 2}$, $A_{electronic\ component\ 3}$, ..., $A_{electronic\ component\ N}$, and M mechanical acceleration coefficients of the mechanical components are $A_{mechanical\ component\ 1}$, $A_{mechanical\ component\ 2}$, $A_{mechanical\ component\ 3}$, ..., $A_{mechanical\ component\ M}$, respectively. Then, based on each of the electronic component acceleration coefficients and each of the mechanical component acceleration coefficients, the overall product acceleration coefficient is determined by $A=\min(A_{electronic\ component\ 1},\ A_{electronic\ component\ 2},\ A_{electronic\ component\ 3},\ \ldots,\ A_{electronic\ component\ N},\ A_{mechanical\ component\ 1},\ A_{mechanical\ component\ 2},\ A_{mechanical\ component\ 3},\ \ldots,\ A_{mechanical\ component\ M})$, i.e., the minimum component acceleration coefficient is determined from N electronic acceleration coefficients of electronic components and M mechanical acceleration coefficients of mechanical components as the overall product acceleration coefficient.

In this embodiment, the normal failure rates under normal operating stress and the accelerated failure rates under accelerated stress of different types of product components are obtained respectively, and for different types of product components, the component acceleration coefficients corresponding to different types of product components are determined based on the normal failure rates under normal operating stress and accelerated failure rates under accelerated stress. Then, based on the component acceleration coefficients corresponding to different types of product components, the overall product acceleration coefficient can be determined. Therefore, on the basis of determining the component acceleration coefficients of different types of product components, the component acceleration coefficients of each product component are comprehensively considered to determine the final overall product acceleration coefficient, so as to evaluate the maximum acceleration factor of the entire product as a whole, reduce error data in the evaluation process, and improve the accuracy of the test results obtained by performing product acceleration tests.

In an exemplary embodiment, as shown in FIG. 5, the step of obtaining the corrected accelerated test stress values corresponding to different types of product components, i.e., correcting the accelerated test stress values corresponding to different types of product components based on the overall product acceleration coefficient, to obtain the corrected accelerated test stress values corresponding to different types of product components, includes the following steps S502 to S506.

In step S502, based on the overall product acceleration coefficient, the component acceleration coefficients corresponding to different types of product components are corrected respectively to obtain the corrected component acceleration coefficients corresponding to different types of product components.

Specifically, the server corrects the component acceleration coefficients corresponding to different types of product components based on the overall product acceleration coefficient, including the electronic component acceleration coefficients corresponding to the electronic components and the mechanical component acceleration coefficients corresponding to the mechanical components, to obtain the electronic component correction acceleration coefficients corresponding to the electronic components and the mechanical component correction acceleration coefficients corresponding to the mechanical components.

Exemplarily, for electronic components, the electronic acceleration coefficients of N electronic components are $A_{electronic\ component\ 1},\ A_{electronic\ component\ 2},\ A_{electronic\ component\ 3},\ \ldots,\ A_{electronic\ component\ N}$ respectively, then based on the overall product acceleration coefficient A, the electronic acceleration coefficients of N electronic components are corrected to obtain the corrected electronic component acceleration coefficients corresponding to the electronic components, including $A'_{electronic\ component\ 1},\ A'_{electronic\ component\ 2},\ A'_{electronic\ component\ 3},\ \ldots,\ A'_{electronic\ component\ N}$. The method for correcting the electronic component acceleration coefficients is as shown in the following formula (4):

$$\begin{cases} A'_{electronic\ component\ 1} = A \\ A'_{electronic\ component\ 2} = A \\ A'_{electronic\ component\ 3} = A \\ \ldots \\ A'_{electronic\ component\ N} = A \end{cases} \quad (4)$$

where $A_{electronic\ component\ 1},\ A_{electronic\ component\ 2},\ A_{electronic\ component\ 3},\ \ldots,\ A_{electronic\ component\ N}$ are the electronic acceleration coefficients of N electronic components, A is the overall product acceleration coefficient, and $A'_{electronic\ component\ 1},\ A'_{electronic\ component\ 2},\ A'_{electronic\ component\ 3},\ \ldots,\ A'_{electronic\ component\ N}$ are the corrected electronic component acceleration coefficients corresponding to N electronic components.

Similarly, for mechanical components, the mechanical acceleration coefficients of M mechanical components are $A_{mechanical\ component\ 1},\ A_{mechanical\ component\ 2},\ A_{mechanical\ component\ 3},\ \ldots,\ A_{mechanical\ component\ M}$ respectively, then based on the overall product acceleration coefficient A, the mechanical acceleration coefficients of M mechanical components are corrected, and the obtained corrected mechanical component acceleration coefficients corresponding to the mechanical components include $A'_{mechanical\ component\ 1},\ A'_{mechanical\ component\ 2},\ A'_{mechanical\ component\ 3},\ \ldots,\ A'_{mechanical\ component\ M}$. The method for correcting the mechanical component acceleration coefficients is shown in the following formula (5):

$$\begin{cases} A'_{mechanical\ component\ 1} = A \\ A'_{mechanical\ component\ 2} = A \\ A'_{mechanical\ component\ 3} = A \\ \ldots \\ A'_{mechanical\ comvonent\ N} = A \end{cases} \quad (5)$$

where $A_{mechanical\ component\ 1},\ A_{mechanical\ component\ 2},\ A_{mechanical\ component\ 3},\ \ldots,\ A_{mechanical\ component\ M}$ are the mechanical acceleration coefficients of M mechanical components, A is the overall product acceleration coefficient, and $A'_{mechanical\ component\ 1},\ A'_{mechanical\ component\ 2},\ A_{mechanical\ component\ 3},\ \ldots,\ A_{mechanical\ component\ M}$ are the corrected mechanical component acceleration coefficients corresponding to M mechanical components.

In step S504, based on the corrected component acceleration coefficients corresponding to the different types of product components, the corrected values for the accelerated test stress values of the different types of product components are obtained by reverse calculation.

In some embodiments, for electronic components, based on the corrected electronic component acceleration coefficients corresponding to the electronic components, a failure rate prediction method is adopted to calculate the corrected values for the accelerated test stress values of the electronic components. Similarly, for mechanical components, based on the corrected mechanical component acceleration coefficients corresponding to the mechanical components, a simulation analysis method is adopted to reversely deduce the corrected values for the accelerated test stress values of the mechanical components.

In step S506, based on the corrected values for the accelerated test stress values of different types of product components, the accelerated test stress values corresponding to the different types of product components are corrected respectively to obtain the corrected accelerated test stress values corresponding to the different types of product components.

In some embodiments, based on the corrected values for the accelerated test stress values of electronic components, the accelerated test stress values corresponding to N electronic components are corrected to obtain the corrected accelerated test stress values corresponding to N electronic components, including $S_1, S_2, S_3, \ldots, S_N$. Similarly, based on the corrected values for the accelerated test stress values of the mechanical components, the accelerated test stress values of M mechanical components are corrected to obtain the corrected accelerated test stress values corresponding to M mechanical components, including $Q_1, Q_2, Q_3, \ldots, Q_M$.

In this embodiment, the component acceleration coefficients corresponding to different types of product components are corrected based on the overall product acceleration coefficient to obtain the corrected component acceleration coefficients corresponding to different types of product components. The corrected values for the accelerated test stress values of different types of product components are obtained based on the corrected component acceleration coefficients corresponding to different types of product components. Based on the corrected values for the accelerated test stress values of different types of product components, the accelerated test stress values corresponding to different types of product components are corrected to obtain the corrected accelerated test stress values corresponding to different types of product components. On the basis of obtaining the component acceleration coefficients of electronic components and mechanical components, the maximum acceleration factor of the entire product is comprehensively evaluated to obtain the overall product acceleration coefficient, and then the corrected values of the accelerated test stress of electronic components and mechanical components are obtained, thereby ensuring the maximum acceleration effect of the entire product, reducing error data in the accelerated test process, and improving the accuracy of the evaluation results obtained by the product accelerated test.

Figure 6:
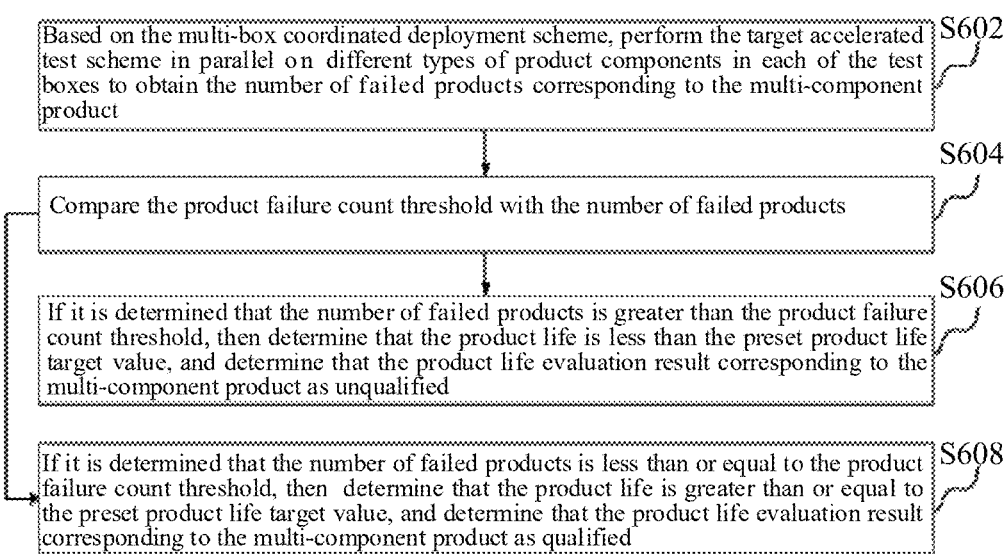
FIG. 6 is a schematic diagram of a process for obtaining a product life evaluation result corresponding to a multi-component product in an embodiment.

In an exemplary embodiment, as shown in FIG. 6, the step of obtaining the product life evaluation result corresponding to the multi-component product, i.e., executing the target accelerated test scheme for the multi-component product based on the multi-box coordinated deployment scheme to obtain the product life evaluation result corresponding to the multi-component product, includes the following steps S602 to S608.

In step S602, based on the multi-box coordinated deployment scheme, the target accelerated test scheme is executed in parallel for different types of product components in each of the test boxes to obtain the number of failed products corresponding to the multi-component product.

In some embodiments, by placing different types of product components of the multi-component product into different test boxes respectively, applying different sensitive stress types and different corrected accelerated test stress values to different test boxes, and connecting different types of product components in each of the test boxes, a multi-box coordinated deployment scheme corresponding to the multi-component product is obtained. Then, based on the multi-box coordinated deployment scheme, the determined target accelerated test scheme can be executed in parallel for different types of product components connected in the test boxes, the product functions and performances of the multi-component product can be monitored in real time, and the number of failed products corresponding to the parallel accelerated test can be counted. It can be understood that the acceleration tests can be conducted on multiple multi-component products according to the above method, and the number of failed products can be obtained by counting the failed products.

Figure 7:
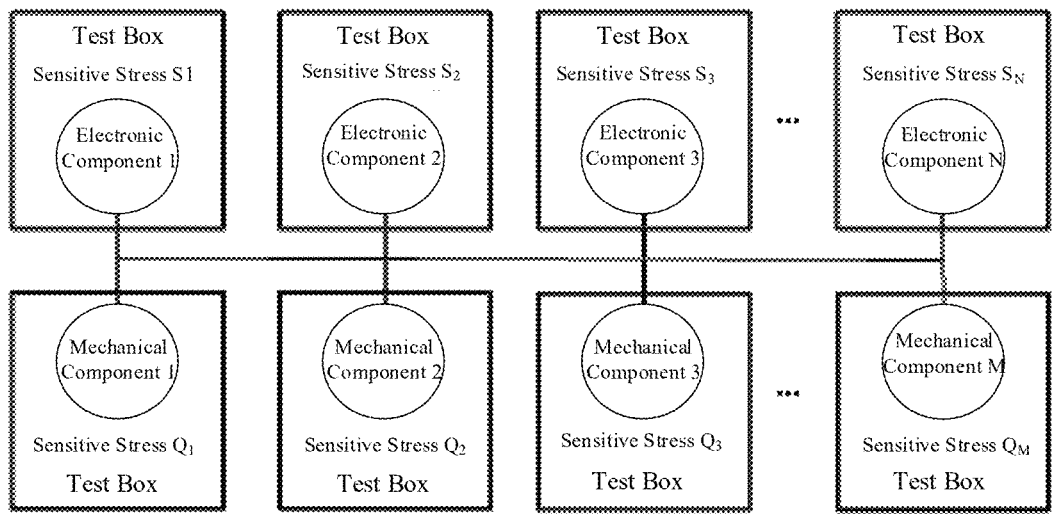
FIG. 7 is a schematic diagram of a multi-box coordinated deployment scheme corresponding to a multi-component product in an embodiment.

In an exemplary embodiment, as shown in FIG. 7, a multi-box coordinated deployment scheme corresponding to a multi-component product is provided. Referring to FIG. 7, it can be seen that by providing a plurality of different test boxes, N electronic components and M mechanical components are respectively placed in different test boxes, and different sensitive stress types and different corrected accelerated test stress values are applied by different test boxes respectively. Different product components are connected by cables. A plurality of product components connected by cables can be determined as product components that need to execute the target accelerated test scheme in parallel, i.e., N electronic components and M mechanical components are connected by cables, i.e., N electronic components and M mechanical components are product components that need to be subjected to the target accelerated test scheme in parallel.

In some embodiments, the components with the same type are placed in the same test box. For example, multiple motors of the same type of a multi-component product are placed in the same test box.

Specifically, referring to FIG. 7, it can be seen that N test boxes are provided for N electronic components (or N types of electronic components), the test box corresponding to electronic component 1 is subjected to sensitive stress $S_1$, the test box corresponding to electronic component 2 is subjected to sensitive stress $S_2$, and so on, the test box corresponding to electronic component N is subjected to sensitive stress $S_N$.

Similarly, referring to FIG. 7, it can be seen that M test boxes are provided for M mechanical components (or M types of mechanical components), the test box corresponding to mechanical component 1 is subjected to sensitive stress $Q_1$, the test box corresponding to mechanical component 2 is subjected to sensitive stress $Q_2$, and so on, the test box corresponding to mechanical component M is subjected to sensitive stress $Q_M$.

In step S604, the product failure count threshold is compared with the number of failed products.

A comparison result is obtained by obtaining a preset product failure count threshold and comparing the product failure count threshold with the number of failed products. The comparison results include that the number of failed products is greater than the product failure count threshold, and that the number of failed products is less than or equal to the product failure count threshold.

In step S606, if it is determined that the number of failed products is greater than the product failure count threshold, then it is determined that the product life is less than the preset product life target value, and the product life evaluation result corresponding to the multi-component product is determined as unqualified.

Specifically, if it is determined that the number of failed products is greater than the product failure count threshold based on the comparison result, then it is determined that the product life is less than the preset product life target value, i.e., the product life evaluation result corresponding to the multi-component product is determined as unqualified.

In step S608, if it is determined that the number of failed products is less than or equal to the product failure count threshold, then it is determined that the product life is greater than or equal to the preset product life target value, and the product life evaluation result corresponding to the multi-component product is determined as qualified.

Specifically, if it is determined that the number of failed products is less than or equal to the product failure count threshold based on the comparison results, i.e., the number of failed products is less than or equal to the product failure count threshold, then it is determined that the product life is greater than or equal to the preset product life target value, i.e., the product life evaluation result corresponding to the multi-component product is determined as qualified.

Exemplarily, as shown in Table 3 (a table of product life evaluation results corresponding to different accelerated test schemes), product life evaluation results corresponding to different accelerated test schemes are provided.

TABLE 3

Product life evaluation results corresponding to different accelerated test schemes

| Test schemes | Accelerated Test Confidence Level | Time Correction Factor | Product Failure Count Threshold | Test Results | Life Evaluation Result |
|---|---|---|---|---|---|
| Scheme 1 | 70% | 3.62 | 2 | $F \leq E_{accept}$ | $T \geq L_{time}$ |
|  |  |  |  | $F > E_{accept}$ | $T < L_{time}$ |
| Scheme 2 | 70% | 2.44 | 1 | $F \leq E_{accept}$ | $T \geq L_{time}$ |
|  |  |  |  | $F > E_{accept}$ | $T < L_{time}$ |
| Scheme 3 | 70% | 1.20 | 0 | $F \leq E_{accept}$ | $T \geq L_{time}$ |
|  |  |  |  | $F > E_{accept}$ | $T < L_{time}$ |
| Scheme 4 | 80% | 2.99 | 1 | $F \leq E_{accept}$ | $T \geq L_{time}$ |
|  |  |  |  | $F > E_{accept}$ | $T < L_{time}$ |
| Scheme 5 | 80% | 1.61 | 0 | $F \leq E_{accept}$ | $T \geq L_{time}$ |
|  |  |  |  | $F > E_{accept}$ | $T < L_{time}$ |

Referring to Table 3, it can be seen that the product life T is evaluated based on the number of failed products F. If $F \leq E_{accept}$, i.e., if the number of failed products F is less than or equal to the product failure count threshold $E_{accept}$, then $T \geq L_{time}$ (i.e., the product life T is greater than or equal to the preset product life target value $L_{time}$), the product life evaluation result is determined as qualified (or the product life meets the specified requirements). On the contrary, if $F > E_{accept}$, i.e., if the number of failed products F is greater than or equal to the product failure count threshold $E_{accept}$, so that $T < L_{time}$ (i.e., the product life T is less than the preset product life target value $L_{time}$), the product life evaluation result is determined as unqualified (or the product life does not meet the specified requirements).

For scheme 1, the accelerated test confidence level ω is 70%, the time correction factor $C_{factor}$ is 3.62, the product failure count threshold is $E_{accept}$ is 2, when the test result obtained is $F \leq E_{accept}$ (i.e., if the number of failed products F is less than or equal to the product failure count threshold $E_{accept}$), the corresponding product life evaluation result is $T \geq L_{time}$ (i.e., the product life T is greater than or equal to the preset product life target value $L_{time}$). If the test result obtained is $F > E_{accept}$ (i.e., if the number of failed products F is greater than or equal to the product failure count threshold $E_{accept}$), the corresponding product life evaluation result is $T < L_{time}$ (i.e., the product life T is less than the preset product life target value $L_{time}$). Similarly, for scheme 2, scheme 3, scheme 4, and scheme 5, the method for determining the test results and the product life evaluation results is the same as that of scheme 1, i.e., when the test result obtained is $F \leq E_{accept}$ (i.e., if the number of failed products F is less than or equal to the product failure count threshold $E_{accept}$), the corresponding product life evaluation result is $T \geq L_{time}$ (i.e., the product life T is greater than or equal to the preset product life target value $L_{time}$). If the test result obtained is $F > E_{accept}$ (i.e., if the number of failed products F is greater than or equal to the product failure count threshold $E_{accept}$), the corresponding product life evaluation result is $T < L_{time}$ (i.e., the product life T is less than the preset product life target value $L_{time}$).

In an exemplary embodiment, a parallel accelerated test is performed on a certain type of servo system to test the life of the servo system. The servo system includes a servo drive and a servo motor. The accelerated test includes the following processing procedures.

① Determination of the electronic component acceleration coefficient: the electronic component of the servo system is the servo drive. By analyzing the failure mode, failure mechanism and sensitive stress type of the servo drive, it is determined that the sensitive stress type of the servo drive is temperature. A temperature stress limit test of the servo drive is performed, and the stress limit of the servo drive is determined to be 70° C. The accelerated test stress value of the servo drive is determined to be 60° C., and the failure rate prediction method is adopted to determine the acceleration factor of the servo drive to be 5.89.

② Determination of the mechanical component acceleration coefficient: the mechanical component of the servo system is the servo motor. By analyzing the failure mode, failure mechanism and sensitive stress type of the servo motor, it is determined that the sensitive stress type of the servo motor is the load. A load stress limit test of the servo motor is performed to determine the stress limit of the servo motor, so as to determine the accelerated test stress value of the servo motor to be 3 times the rated load, and adopt simulation analysis method to determine the acceleration coefficient of the servo motor to be 7.23.

③ Determination of the overall product acceleration coefficient: based on the acceleration coefficients of the servo drive and servo motor, the acceleration coefficient of the servo system is determined to be 5.89, the corrected value of the accelerated test stress of the servo drive is 60° C., and the corrected value of the accelerated test stress of the servo motor is 2.6 times the rated load.

④ Development of parallel accelerated test scheme: the servo drive and servo motor are placed in different test boxes, different sensitive stress types and corrected values of the accelerated test stress are applied by the boxes respectively, and different components are connected through wiring to perform parallel accelerated tests at the same time.

Figure 8:
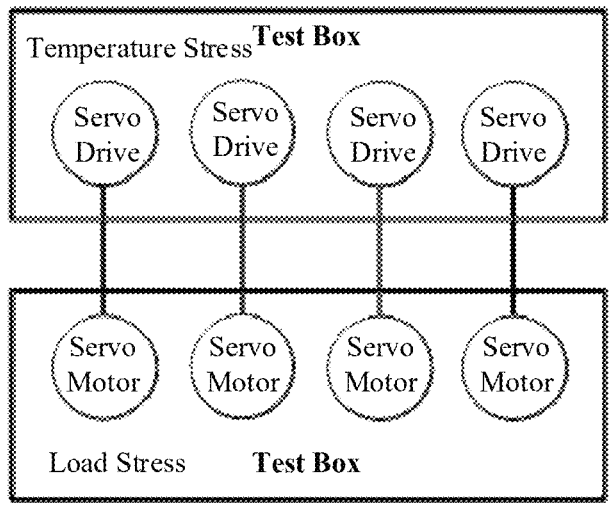
FIG. 8 is a schematic diagram of the deployment of an accelerated test scheme for a servo system in an embodiment.

Exemplarily, as shown in FIG. 8, a deployment diagram of an accelerated test scheme for a servo system is provided. Referring to FIG. 8, the test boxes include a test box for providing temperature stress and a test box for providing load stress. Each servo drive and a corresponding servo motor are connected by a cable. The total number of servo systems for the accelerated test is 4, i.e., the accelerated test is applied to the 4 servo systems (including 4 servo drives and 4 servo motors) are all executed in parallel.

The preset product life target value $L_{time}$ is 15000 hours, i.e., $L_{time}$=15000 h. Scheme 3 in Table 3 is selected to perform the servo system accelerated test, the accelerated test confidence level ω is 70%, the time correction factor $C_{factor}$ is 1.20, the product failure count threshold is 0, i.e., $E_{accept}$=0, then the servo system accelerated test time $D_{test}$ is determined to be 764 h.

⑤ Implementation of parallel accelerated test: based on the parallel accelerated test scheme of the servo system, parallel accelerated tests are performed to monitor the functions and performances of the servo systems in real time, and the number of failed products of the servo systems monitored during the test process is 0.

⑥ Product life evaluation: the number of failed products of the servo system obtained in the testing process is 0, and the preset product failure count threshold $E_{accept}$ is 0, so it can be determined that the life evaluation result of the servo system is qualified, i.e., the life of the servo system meets the specified requirements.

A 764-hour parallel accelerated test is performed to evaluate the 15,000-hour life of the servo system. If a conventional unaccelerated reliability test method is adopted, the test time is 4500 h, and if a conventional serial accelerated test method is adopted, the test time is at least extended by 1 time. Therefore, by adopting the parallel accelerated test method in the embodiments of the present disclosure, the acceleration effect is increased by 83% compared with a conventional reliability test efficiency, and the efficiency of the parallel accelerated test is increased by 50% compared with the conventional serial accelerated test.

In this embodiment, the target accelerated test scheme is executed in parallel based on the multi-box coordinated deployment scheme, which greatly reduces the test time and improves the product test efficiency. In addition, based on the product failure count threshold and the preset product life target value, it can be accurately determined whether the product life of the present multi-component product is qualified, so as to eliminate unqualified products in time, prevent the unqualified products from put into use, ensuring the safety of the production process.

It should be understood that, although the steps in the flowcharts involved in the above embodiments are displayed in sequence as indicated by the arrows, these steps are not necessarily executed in the order indicated by the arrows. Unless otherwise specified herein, there is no strict order limitation for the execution of these steps, and these steps may be executed in other orders. Moreover, at least a part of the steps in the flowcharts involved in the above embodiments may include multiple steps or multiple stages. These steps or stages are not necessarily executed at the same time, but can be executed at different times. The execution order of these steps or stages is not necessarily sequential, but can be executed in turn or alternately with other steps or at least part of the steps or stages in other steps.

Based on the same inventive concept, an embodiment of the present disclosure further provides a parallel accelerated test apparatus that separately applies multiple sensitive stress to multiple components for implementing the above-mentioned parallel accelerated test method. The solution to the problem provided by the apparatus is similar to the solution described in the above method. Therefore, the specific limitations in the embodiments of one or more parallel accelerated test apparatus provided below can be found in the above limitations on the parallel accelerated test method, and will not be repeated here.

Figure 9:
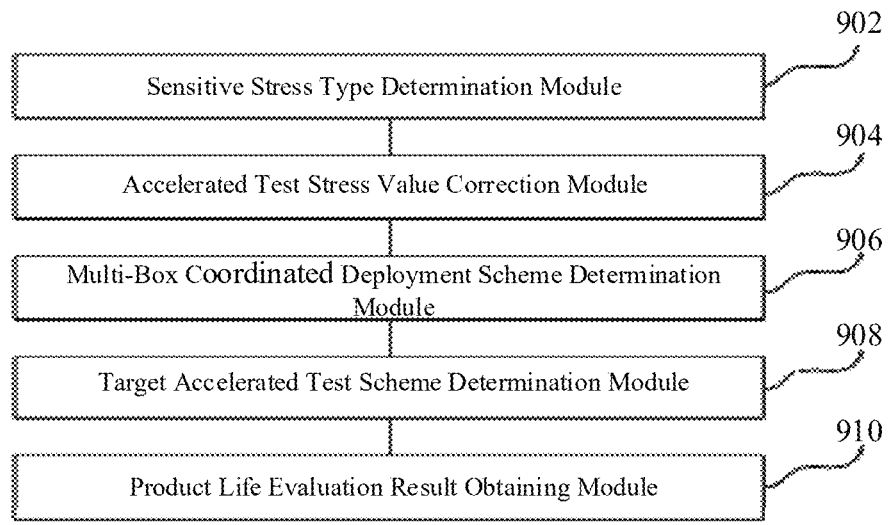
FIG. 9 is a block diagram of a structure of a parallel accelerated test apparatus that separately applies multiple sensitive stresses to multiple components in an embodiment.

In an exemplary embodiment, as shown in FIG. 9, a parallel accelerated test apparatus is provided, including: a sensitive stress type determination module 902, an accelerated test stress value correction module 904, a multi-box coordinated deployment scheme determination module 906, a target accelerated test scheme determination module 908, and a product life evaluation result obtaining module 910.

The sensitive stress type determination module 902 is configured to determine sensitive stress types of different types of product components in a multi-component product respectively, and determine accelerated test stress values of the different types of product components respectively based on the sensitive stress types of the different types of product components.

The accelerated test stress value correction module 904 is configured to determine an overall product acceleration coefficient corresponding to the multi-component product, and correct the accelerated test stress values corresponding to the different types of product components respectively based on the overall product acceleration coefficient to obtain corrected accelerated test stress values corresponding to the different types of product components.

The multi-box coordinated deployment scheme determination module 906 is configured to determine a multi-box coordinated deployment scheme corresponding to the multi-component product based on the sensitive stress types and the corrected accelerated test stress values of the different types of product components.

The target accelerated test scheme determination module 908 is configured to determine a target accelerated test scheme from candidate accelerated test schemes based on an accelerated test confidence level and a product failure count threshold corresponding to the multi-component product.

The product life evaluation result obtaining module 910 is configured to execute the target accelerated test scheme for the multi-component products based on the multi-box coordinated deployment scheme to obtain a product life evaluation result corresponding to the multi-component product.

In the above-mentioned parallel accelerated test apparatus, the accelerated test stress values of different types of product components can be reversed on the basis of a comprehensive evaluation of the overall product acceleration coefficient, thereby ensuring the maximum acceleration effect of the entire product. Furthermore, based on the sensitive stress types and the corrected acceleration test stress values of different types of product components, the multi-box coordinated deployment scheme corresponding to the multi-component product can be determined. Based on the multi-box coordinated deployment scheme, the target accelerated test scheme is performed on the multi-component product to obtain the product life evaluation result corresponding to the multi-component product. Applying different sensitive stresses to the different types of product components and performing parallel accelerated tests at the same time are realized, which reduces repetitive and tedious test operations and product testing time, while further improving the product testing efficiency based on multi-component products.

In an exemplary embodiment, the sensitive stress type determination module is further configured to determine the product failure modes for each type of the different types of product components in the multi-component product; determine a failure mechanism based on the product failure modes, and obtain stress types associated with the failure mechanism; and screen the stress types to obtain the sensitive stress type of each of the different types of product components respectively based on sensitive stress type screening criteria.

In an exemplary embodiment, the sensitive stress type determination module is further configured to determine stress limits of the different types of product components based on the sensitive stress types of the different types of product components, and determine the accelerated test stress values of the different types of product components respectively based on the stress limits of the different types of product components.

In an exemplary embodiment, a parallel accelerated test apparatus that separately applies multiple sensitive stresses to multiple components is provided. The apparatus further includes an overall product acceleration coefficient determination module, which is configured to obtain the normal failure rates under normal operating stress and the accelerated failure rates under accelerated stress of different types of product components respectively, for different types of product components, determine the component acceleration coefficients corresponding to different types of product components based on the normal failure rates under normal operating stress and the accelerated failure rates under accelerated stress, and determine the overall product acceleration coefficient based on the component acceleration coefficients corresponding to different types of product components.

In an exemplary embodiment, the accelerated test stress value correction module is configured to correct the component acceleration coefficients corresponding to the different types of product components respectively based on the overall product acceleration coefficient, to obtain corrected component acceleration coefficients corresponding to the different types of product components; based on the corrected component acceleration coefficients corresponding to the different types of product components, obtain corrected values for the accelerated test stress values of the different types of product components reversely; based on the corrected values for the accelerated test stress values of the different types of product components, correct the accelerated test stress values corresponding to the different types of product components respectively to obtain the corrected accelerated test stress values corresponding to the different types of product components.

In an exemplary embodiment, the multi-box coordinated deployment scheme determination module is further configured to place different types of product components of the multi-component product into different test boxes respectively, apply different sensitive stress types and different corrected accelerated test stress values to different test boxes respectively, and connect the different types of product components in each of the test boxes to obtain a multi-box coordinated deployment scheme corresponding to the multi-component product.

In an exemplary embodiment, the product life evaluation result obtaining module is further configured to, based on the multi-box coordinated deployment scheme, execute the target accelerated test scheme in parallel for different types of product components in the test boxes to obtain the number of failed products corresponding to the multi-component product, compare the product failure count threshold with the number of failed products, if it is determined that the number of failed products is greater than the product failure count threshold, then determine that the product life is less than the preset product life target value and the product life evaluation result corresponding to the multi-component product is unqualified, and if it is determined that the number of failed products is less than or equal to the product failure count threshold, then determine that the product life is greater than or equal to the preset product life target value and the product life evaluation result corresponding to the multi-component product is qualified.

In an exemplary embodiment, a parallel accelerated test apparatus that separately applies multiple sensitive stresses to multiple components to multiple components is provided. The apparatus further includes an accelerated test time determination module, which is configured to obtain the preset product life target value corresponding to the multi-component product and the number of multi-component products to be accelerated tested, and determine the accelerated test time corresponding to the multi-component product based on the time correction factor corresponding to the multi-component product, the preset product life target value, the preset product life target value, and the number of multi-component products. The accelerated test time is configured to determine the accelerated test efficiency of the multi-component product.

Each module in the above-mentioned parallel accelerated test apparatus for multiple components and multiple sensitive stresses with separate loading can be fully or partially realized by software, hardware and a combination thereof. The above modules may be embedded in or independent of a processor in a computer device in the form of hardware, or may be stored in a memory in a computer device in the form of software, so that the processor can call and execute operations corresponding to the above modules.

Figure 10:
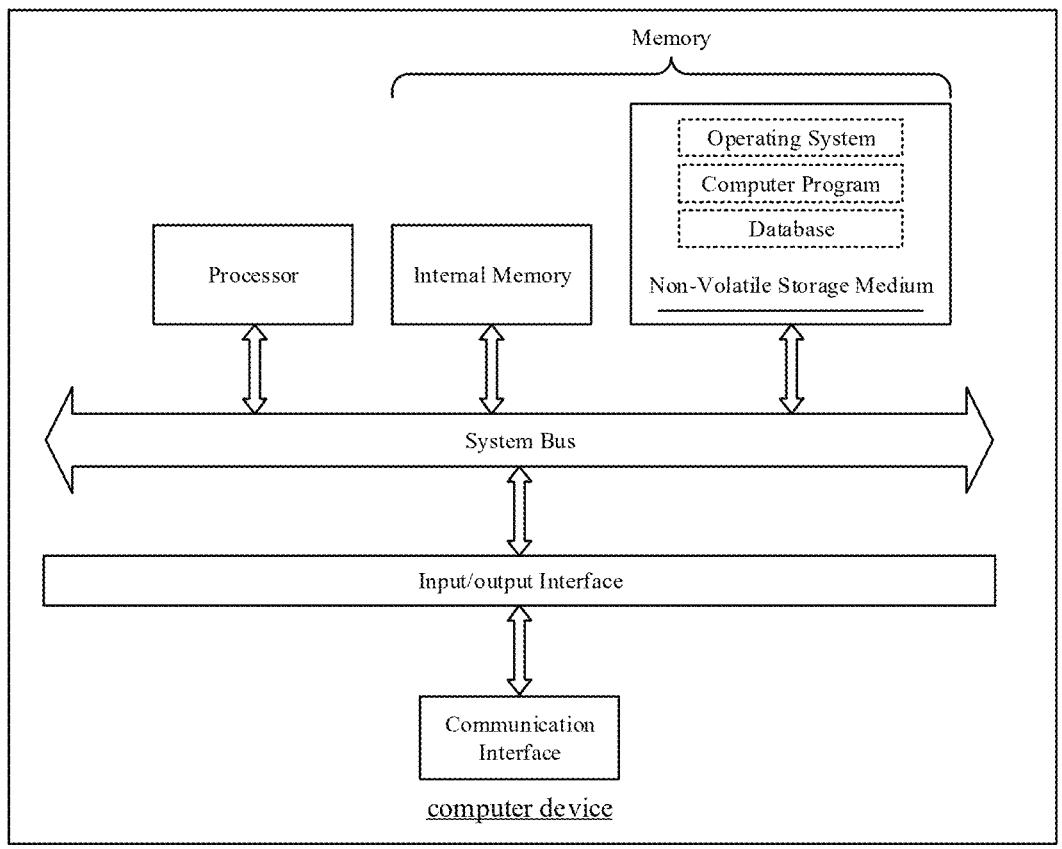
FIG. 10 is a schematic diagram of an internal configuration of a computer device in an embodiment.

In an exemplary embodiment, a computer device is provided. The computer device may be a server, and its schematic diagram of internal configuration may be as shown in FIG. 10. The computer device includes a processor, a memory, an input/output interface (I/O for short) and a communication interface. The processor, the memory and the input/output interface are connected via a system bus, and the communication interface is connected to the system bus via the input/output interface. The processor of the computer device is configured to provide computing and control capabilities. The memory of the computer device includes a non-transitory storage medium and an internal memory. The non-transitory storage medium stores an operating system, a computer program and a database. The internal memory provides an environment for the operation of the operating system and computer programs in the non-transitory storage medium. The database of the computer device is configured to store data such as the sensitive stress types of different types of product components, the accelerated test stress values of different types of product components, the overall product acceleration coefficient, the corrected stress values in accelerated test corresponding to different types of product components, the multi-box coordinated deployment scheme, the target accelerated test scheme, and the product life evaluation result. The input/output interface of the computer device is configured to exchange information between the processor and external devices. The communication interface of the computer device is configured to communicate with an external terminal via a network connection. A processor, when executing the computer program, a parallel accelerated test method that separately applies multiple sensitive stresses to multiple components is implemented.

Those skilled in the art will understand that the configuration shown in FIG. 10 is merely a block diagram of a partial configuration related to the solution of the present disclosure, and does not constitute a limitation on the computer device to which the solution of the present disclosure is applied. The specific computer device may include more or fewer components than shown in the figure, or combine certain components, or have a different arrangement of components.

In an exemplary embodiment, a computer device is provided, including a memory and a processor. A computer program is stored in the memory. The processor, when executing the computer program, implements the steps in the above-mentioned parallel accelerated test method that separately applies multiple sensitive stresses to multiple components.

In an exemplary embodiment, a computer-readable storage medium is provided, on which a computer program is stored. A processor, when executing the computer program, implements the steps in the above-mentioned parallel accelerated test method that separately applies multiple sensitive stresses to multiple components.

In an exemplary embodiment, a computer program product is provided, including a computer program. A processor, when executing the computer program, implements the steps in the above-mentioned parallel accelerated test method that separately applies multiple sensitive stresses to multiple components.

It should be noted that the user information (including but not limited to user device information, user personal information, etc.) and data (including but not limited to data used for analysis, stored data, displayed data, etc.) involved in the present disclosure are those authorized by the user or sufficiently authorized by the parties. The collection, use and processing of the relevant data need to comply with the relevant laws, regulations and standards of the relevant countries and regions.

Those of ordinary skill in the art can understand that all or part of the processes in the methods of the above embodiments can be completed by instructing relevant hardware through a computer program. The computer program can be stored in a non-volatile computer-readable storage medium. The computer program, when executed, may include processes such as those of the embodiments of the methods described above. Any reference to memory, database or other media used in the embodiments provided in the present disclosure may include at least one of non-volatile and volatile memory. Non-volatile memory can include read-only memory (ROM), magnetic tape, floppy disk, flash memory, optical memory, high-density embedded non-volatile memory, resistive memory (ReRAM), Magnetoresistive Random Access Memory (MRAM), Ferroelectric Random Access Memory (FRAM), Phase Change Memory (PCM), graphene memory, etc. Volatile memory may include Random Access Memory (RAM) or external cache memory, etc. By way of illustration and not limitation, RAM can be in many forms, such as Static Random Access Memory (SRAM) or Dynamic Random Access Memory (DRAM). The databases involved in the various embodiments provided in the present disclosure may include at least one of a relational database and a non-relational database. Non-relational databases may include blockchain-based distributed databases, etc., but are not limited thereto. The processors involved in the various embodiments provided in the present disclosure may be general-purpose processors, central processing units, graphics processors, digital signal processors, programmable logic devices, quantum computing-based data processing logic devices, etc., and are not limited to this.

The technical features of the above embodiments can be randomly combined. To simplify the description, not all possible combinations of the technical features in the above embodiments are described. However, as long as there is no contradiction in the combination of these technical features, all the combinations should be considered to be included within the scope of this specification.

The above-described embodiments only illustrate several embodiments of the present disclosure, and the descriptions of which are relatively specific and detailed, but should not be construed as limiting the scope of the patent disclosure. It should be noted that, for those of ordinary skill in the art, several modifications and improvements can be made without departing from the concept of the present disclosure, and these all fall within the protection scope of the present disclosure. Therefore, the protection scope of the present disclosure should be determined by the appended claims.

What is claimed is:

1. A parallel accelerated test method that separately applies multiple sensitive stresses to multiple components, the method being applied to a testing system, the testing system comprising a server and a test device, the test device comprising multiple test boxes, each of the test boxes being configured to perform an accelerated test on product components placed therein, the method comprising:

determining sensitive stress types of different types of product components in a multi-component product respectively, and determining accelerated test stress values of the different types of product components respectively based on the sensitive stress types of the different types of product components, the sensitive stress type of the product component being the stress type that affects more product failure modes of the product component;

determining component acceleration coefficients corresponding to the different types of product components, determining a minimum component acceleration coefficient based on the component acceleration coefficients, using the minimum component acceleration coefficient as an overall product acceleration coefficient corresponding to the multi-component product, and correcting the accelerated test stress values corresponding to the different types of product components respectively based on the overall product acceleration coefficient to obtain corrected accelerated test stress values corresponding to the different types of product components, the component acceleration coefficients corresponding to different product components being determined based on a ratio of a normal failure rate under normal operating stress to an accelerated failure rate under accelerated stress of each of the different product components;

placing different types of product components of the multi-component product into different test boxes respectively, applying different sensitive stress types and different corrected accelerated test stress values to different test boxes respectively, and connecting the different types of product components in each of the test boxes to obtain a multi-box coordinated deployment scheme corresponding to the multi-component product;

determining a target accelerated test scheme from candidate accelerated test schemes based on an accelerated test confidence level and a product failure count threshold corresponding to the multi-component product; and under the multi-box coordinated deployment scheme, executing the target accelerated test scheme in parallel for the different types of multi-component product connected in the test boxes, monitoring product functions and performances of the multi-component product in real time, counting a number of failed products corresponding to parallel accelerated test, and obtaining a product life evaluation result corresponding to the multi-component product based on the number of failed products and the preset product failure count threshold;

wherein correcting the accelerated test stress values corresponding to the different types of product components respectively based on the overall product acceleration coefficient to obtain corrected accelerated test stress values corresponding to the different types of product components comprises: based on the overall product acceleration coefficient, correcting the component acceleration coefficients corresponding to the different types of product components respectively to obtain corrected component acceleration coefficients corresponding to the different types of product components; based on the corrected component acceleration coefficients corresponding to the different types of product components, deducing corrected values for the accelerated test stress values of the different types of product components reversely; based on the corrected values for the accelerated test stress values of the different types of product components, correcting the accelerated test stress values corresponding to the different types of product components respectively to obtain the corrected accelerated test stress values corresponding to the different types of product components.

2. The method according to claim 1, wherein determining the sensitive stress types of different types of product components in the multi-component product respectively, comprises:
determining the product failure modes for each type of the different types of product components in the multi-component product;
determining failure mechanisms based on the product failure modes, and obtaining stress types associated with the failure mechanisms; and
based on sensitive stress type screening criteria, screening the stress types to obtain the sensitive stress type of each type of the different types of product components respectively.

3. The method according to claim 1, wherein determining the accelerated test stress values of the different types of product components respectively based on the sensitive stress types of the different types of product components, comprises:
based on the sensitive stress types of the different types of product components, determining stress limits of the different types of product components; and
based on the stress limits of the different types of product components, determining the accelerated test stress values of the different types of product components respectively.

4. The method according to claim 1, wherein determining the component acceleration coefficients corresponding to the different types of product components, determining the minimum component acceleration coefficient based on the component acceleration coefficients, using the minimum component acceleration coefficient as the overall product acceleration coefficient corresponding to the multi-component product, comprises:
obtaining normal failure rate under normal operating stress and accelerated failure rate under accelerated stress of each of the different types of product components respectively;
for the different types of product components, determining the component acceleration coefficients corresponding to the different types of product components based on the normal failure rate under normal operating stress and the accelerated failure rate under accelerated stress of each of the different types of product components respectively; and
based on the component acceleration coefficients corresponding to the different types of product components, determining the minimum component acceleration coefficient as the overall product acceleration coefficient.

5. The method according to claim 1, wherein under the multi-box coordinated deployment scheme, executing the target accelerated test scheme in parallel for the different types of multi-component product connected in the test boxes, monitoring product functions and performances of the multi-component product in real time, counting the number of failed products corresponding to the parallel accelerated test, and obtaining the product life evaluation result corresponding to the multi-component product based on the number of failed products and the preset product failure count threshold, comprises:
under the multi-box coordinated deployment scheme, executing the target accelerated test scheme in parallel for the different types of product components connected in the test boxes, monitoring the product functions and performances of the multi-component products in real time, and counting the number of failed products corresponding to the multi-component products under the parallel accelerated test;
obtaining the preset product failure count threshold, and comparing the product failure count threshold with the number of failed products;
if it is determined that the number of failed products is greater than the product failure count threshold, then determining that the product life is less than a preset product life target value, and determining the product life evaluation result corresponding to the multi-component product as unqualified; and
if it is determined that the number of failed products is less than or equal to the product failure count threshold, then determining that the product life is greater than or equal to the preset product life target value, and determining the product life evaluation result corresponding to the multi-component product as qualified.

6. The method according to claim 1, wherein the method further comprises:
obtaining the preset product life target value corresponding to the multi-component product and a number of multi-component products to be accelerated tested; and
determining an accelerated test time corresponding to the multi-component products based on a time correction factor, the preset product life target value, the overall product acceleration coefficient corresponding to the multi-component product and the number of multi-component products, the accelerated test time being configured to determine an accelerated test efficiency of the multi-component product.

7. A computer device comprising a memory and a processor, the memory storing a computer program, wherein the processor, when executing the computer program, implements the steps of claim 1.

8. A parallel accelerated test apparatus that separately applies multiple sensitive stresses to multiple components, comprising:

a sensitive stress type determination module configured to determine sensitive stress types of different types of product components in a multi-component product respectively, and determine accelerated test stress values of the different types of product components respectively based on the sensitive stress types of the different types of product components, the sensitive stress type of the product component being the stress type that affects more product failure modes of the product component;

an accelerated test stress value correction module configured to determine component acceleration coefficients corresponding to the different types of product components, determine a minimum component acceleration coefficient based on the component acceleration coefficients, use the minimum component acceleration coefficient as an overall product acceleration coefficient corresponding to the multi-component product, and correcting the accelerated test stress values corresponding to the different types of product components respectively based on the overall product acceleration coefficient to obtain corrected accelerated test stress values corresponding to the different types of product components, the component acceleration coefficients corresponding to different product components being determined based on a ratio of a normal failure rate under normal operating stress to an accelerated failure rate under accelerated stress of each of the different product components;

a multi-box coordinated deployment scheme determination module configured to, after different types of product components of the multi-component product are placed into different test boxes respectively, apply different sensitive stress types and different corrected accelerated test stress values to different test boxes respectively, and connect the different types of product components in each of the test boxes to obtain a multi-box coordinated deployment scheme corresponding to the multi-component product;

a target accelerated test scheme determination module configured to determine a target accelerated test scheme from candidate accelerated test schemes based on an accelerated test confidence level and a product failure count threshold corresponding to the multi-component product; and a product life evaluation result obtaining module configured to execute the target accelerated test scheme in parallel for the different types of multi-component products connected in the test boxes under the multi-box coordinated deployment scheme, monitor product functions and performances of the multi-component product in real time, count a number of failed products corresponding to the parallel accelerated test, and obtain a product life evaluation result corresponding to the multi-component product based on the number of failed products and the product failure count threshold;

wherein the accelerated test stress value correction module is configured to correct the component acceleration coefficients corresponding to the different types of product components respectively based on the overall product acceleration coefficient, to obtain corrected component acceleration coefficients corresponding to the different types of product components; based on the corrected component acceleration coefficients corresponding to the different types of product components, deduce corrected values for the accelerated test stress values of the different types of product components reversely; based on the corrected values for the accelerated test stress values of the different types of product components, correct the accelerated test stress values corresponding to the different types of product components respectively to obtain the corrected accelerated test stress values corresponding to the different types of product components.

9. The apparatus according to claim 8, wherein the sensitive stress type determination module is further configured to:

determine the product failure modes for each type of the different types of product components in the multi-component product; determine failure mechanisms based on the product failure modes, and obtain stress types associated with the failure mechanisms; and screen the stress types to obtain the sensitive stress type of each type of the different types of product components respectively based on sensitive stress type screening criteria.

10. The apparatus according to claim 8, wherein the sensitive stress type determination module is further configured to:

based on the sensitive stress types of the different types of product components, determine stress limits of the different types of product components; and based on the stress limits of the different types of product components, determine the accelerated test stress values of the different types of product components respectively.

* * * * *